M. O. SMITH.
Draft-Evener.
No. 210,160. Patented Nov. 19, 1878.
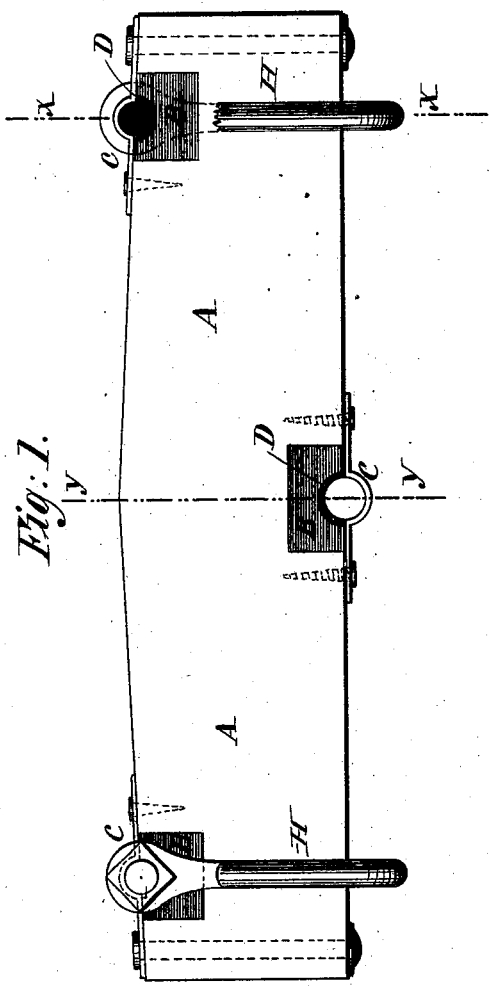
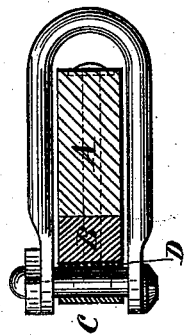
WITNESSES:
Achilles Schehl.
C. Sedgwick
INVENTOR:
M. O. Smith
BY Munn & Co
ATTORNEYS.
N. PETERS, PHOTO-LITHOGRAPHER, WASHINGTON, D. C.

UNITED STATES PATENT OFFICE.

MELVIN O. SMITH, OF CHENANGO FORKS, NEW YORK.

IMPROVEMENT IN DRAFT-EVENERS.

Specification forming part of Letters Patent No. 210,160, dated November 19, 1878; application filed July 15, 1878.

*To all whom it may concern:*

Be it known that I, MELVIN OSCAR SMITH, of Chenango Forks, in the county of Broome and State of New York, have invented a new and useful Improvement in Draft-Eveners, of which the following is a specification:

Figure 1 is a top view of my improved evener. Fig. 2 is a cross-section of the same, taken through the line $x$ $x$, Fig. 1. Fig. 3 is a cross-section of the same, taken through the line $y$ $y$, Fig. 2.

Similar letters of reference indicate corresponding parts.

The object of this invention is to improve the construction of draft-eveners in such a way that there will be no "dead jerk" should the load strike an obstruction, and thus prevent the horse's breast from being galled or bruised.

The invention consists in an evener provided with rubber blocks placed in recesses for the clevis and hammer-bolts to rest against, as hereinafter fully described.

A represents the draft-bar, double-tree, or draft-evener, in the rear side of the ends, and in the forward side of the center of which are formed recesses, in which are placed rubber blocks B for the clevis H and hammer-bolts to rest against. In the outer edges of the rubber blocks B are formed half-round notches for the said bolts to rest in, and in which the bolts are secured by metal straps or keepers C, attached to the said evener, and in which are formed half-round recesses to receive the bolts. The half-round notches in the rubber blocks B have semi-tubular plates D placed in them for the bolts to bear against.

By the use of this device there will be no sudden or dead jerk in starting, and when the load or draft strikes an obstruction there will be no sudden jar to the draft or vehicle.

Having thus described my invention, I claim as new and desire to secure by Letters Patent—

The draft-evener herein described, consisting of the bar A, notched rubber block B, keeper C, tubular plates D, and clevises H, all constructed and relatively arranged as and for the purpose specified.

MELVIN O. SMITH.

Witnesses:
SOLON C. KEMON,
CHAS. A. PETTIT.